June 23, 1936.　　　R. DEBENEDETTI　　　2,044,900
FLEXIBLE METAL TUBE
Filed Feb. 25, 1931
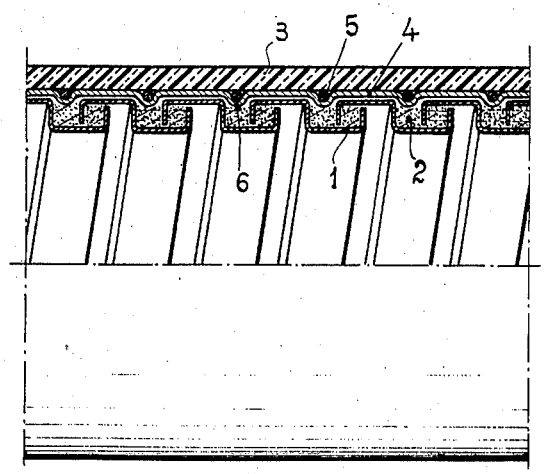
Inventor
R. Debenedetti,
by E. F. Wenderoth,
Atty Patented June 23, 1936

2,044,900

UNITED STATES PATENT OFFICE 2,044,900

FLEXIBLE METAL TUBE

Rodolfo Debenedetti, Turin, Italy, assignor to Chicago Tubing & Braiding Company, Chicago, Ill.

Application February 25, 1931, Serial No. 518,209
In Italy March 3, 1930

5 Claims. (Cl. 138—58)

This invention relates to flexible metal tubes comprising an outer rubber covering and also, if any, a soft packing intermediate the metal convolutions providing the tube body.

This invention has for its object a flexible tube of this class in which the rubber covering is protected against attack by liquid flowing through or contained in the tube, when such a tube is used in connection with liquids, as gasoline, benzine, naphtha or similar motor spirits, able to attack or dissolve rubber material.

In this invention intermediate the metal body of a tube of above recited class and the outer rubber covering of the same is located a layer of a material which is unaffected by the liquid the tube is intended to convey or to contain, as hydrocarbon liquids or the like, examples of such material being paraffin treated paper, cellulose derivatives or the like.

A construction of a tube according to this invention is shown by way of example on the figure of the annexed drawing, in which a portion of a tube is shown partly in central section and partly in elevation.

In said figure, 1 denotes a spirally wound metal channel strip whose convolutions interengage each other to provide the tube body; 2 is a soft packing located intermediate said convolutions and 3 is an outer covering or sheath made of rubber or rubber material.

To prevent amounts, even if very small, of liquid which may permeate through the tube body, contacting the rubber material providing the outer covering 3 and attacking or destroying it, around the core provided by metal strip 1 and packing 2, a layer 4 is located such a layer consisting of a material unaffected by hydrocarbon liquids, or, generally speaking, by liquid for which the tube is intended. The layer 4 is held in position and tightened over the core 1, 2 by means of the outer covering 3. The layer 4, it will be noted, due to the manner in which it is positioned upon the core 1, 2, is somewhat flexibly secured since the corrugations developed therein will permit the layer 4 to give to the bending of the core and not tear and thereby allow the hydrocarbon liquid to penetrate therethrough and attack the outer rubber covering.

Said layer 4 may consist of paraffin-treated paper or of cellulose derivatives as cellophane and the like, and it may be provided in any suitable manner, say by spirally winding a tape of a suitable material as above defined over the core 1—2, or by applying such a material while in liquid condition over said core 1—2.

To prevent layer 4 from being torn when the tube is bent or deflected, it is conveniently made somewhat extensible in the direction of the tube axis, say by giving a transversely corrugated shape to the tubular layer 4.

For such a purpose, after the layer 4 applied in position, a wire 5 is laid and tensioned over the same, said wire 5 entering intermediate the convolutions of channel strip 1 and into soft packing 2 and producing a continuous spiral groove in said layer 4.

A tube made in the described manner may be used without possibility of being injured, in connection with hydrocarbon liquids and generally with fluids able to attack rubber material, because any liquid which may leak or permeate through interengaged portions of channel strip 1 is prevented from flowing beyond layer 4 which is unaffected by and impervious to it, such liquid being thus prevented from contacting with rubber material which provides the outer covering 3.

The described tube may be made in a different manner than the described and illustrated one, and particularly the metal body may consist of a strip having a different cross-section or of a wire, and the rubber covering may consist of a rubber tube inserted over the metal body or of a layer laid and vulcanized over said metal body.

When said outer rubber covering is vulcanized after laid over said metal tube and the intermediate layer consists of a tape 4 of a cellulose derivative, as cellophane, wound thereon, due to heat treatment during vulcanization in combination with the tightening action of the said rubber covering, the convolutions of said tape 4 adhere with each other thus providing an uninterrupted or integral tubular wall located intermediate the metal body and the outer covering.

In any event by the present invention intermediate the metal body and the outer rubber covering a layer is provided which is unaffected by liquids able to attack rubber material, and the completed tube thus obtained may be used in connection with liquids able to attack rubber material without injury therefrom.

What I claim as my invention and desire to secure by United States Letters Patent is:—

1. A flexible tube for conducting hydrocarbon liquids and the like comprising a flexible metal body formed from a metal strip wound in which helical convolutions interlock with each other and providing an outer helical groove, a layer of a cellulose derivative impervious to hydrocarbon liquids and the like positioned upon the outer surface of said body, corrugations in said layer corresponding to said groove in said metal body to provide flexibility of said layer and an external cover of rubber positioned about said layer.

2. A flexible tube for conducting hydrocarbon liquids and the like comprising a flexible metal body having external corrugations therein, a layer of cellulose derivative impervious to hydrocarbon liquids and the like positioned around said body, corrugations in said layer corresponding to the corrugations of said body and an external cover of rubber surrounding said layer whereby flexibility is provided for said impervious layer to permit the same to flex with said body without fracture.

3. A flexible tube for hydrocarbon liquids and the like comprising a metal body formed from a metal strip wound in helical convolutions so as to provide interlocking edges and an outer helical groove, an impervious layer of a cellulose derivative located about the outer surface of said body, a flexible filament helically wound and tensioned upon said layer forcing the same to enter the helical groove provided in said metal body and an external cover of rubber upon said layer.

4. A flexible tube for hydrocarbon liquids and the like comprising a flexible metal body having external corrugations therein, a layer of cellulose derivative positioned about said body and provided with corrugations corresponding to the corrugations in said body, a flexible filament positioned in the corrugations of said layer and an external cover of rubber positioned about said layer.

5. A flexible tube for conducting hydrocarbon liquids and the like comprising a flexible metallic base member having external ridges movable relative to each other lengthwise the tube incident to flexing of the tube, a layer of cellulose derivative impervious to hydrocarbon liquids and the like positioned around said base, corrugations of said layer corresponding to the ridges of said body, and an external cover of rubber surrounding said layer whereby flexibility is provided for said layer to permit the same to flex with said base without fracture.

RODOLFO DEBENEDETTI.